(12) United States Patent
Campbell (10) Patent No.: US 7,546,224 B2
(45) Date of Patent: Jun. 9, 2009

(54) METHOD FOR ASSESSING THE INTEGRITY OF A STRUCTURE

(76) Inventor: Robert Campbell, 51 Netherpark Avenue, Netherlee, Glasgow (GB) G44 3XN ( * ) Notice: Subject to any disclaimer, the term of this patent is extended or adjusted under 35 U.S.C. 154(b) by 285 days.

(21) Appl. No.: 10/506,396

(22) PCT Filed: Mar. 3, 2003

(86) PCT No.: PCT/GB03/00868

§ 371 (c)(1),
(2), (4) Date: Sep. 1, 2004

(87) PCT Pub. No.: WO03/075109

PCT Pub. Date: Sep. 12, 2003

(65) Prior Publication Data

US 2005/0107963 A1 May 19, 2005

(30) Foreign Application Priority Data

Mar. 2, 2002 (GB) ................................. 0204932.8

(51) Int. Cl.
*G06F 17/50* (2006.01)
(52) U.S. Cl. ............................................ 703/1; 702/33
(58) Field of Classification Search .................. 703/1
See application file for complete search history.

(56) References Cited

U.S. PATENT DOCUMENTS

| 4,128,011 A | * | 12/1978 | Savage | 73/579 |
| 4,419,900 A | | 12/1983 | Scott et al. | 73/862.06 |
| 4,480,480 A | * | 11/1984 | Scott et al. | 73/769 |
| 4,852,397 A | | 8/1989 | Haggag | 73/82 |
| 4,858,146 A | * | 8/1989 | Shebini | 703/1 |
| 4,901,575 A | * | 2/1990 | Bohannan et al. | 73/587 |

(Continued)

FOREIGN PATENT DOCUMENTS

EP 0358994 3/1990

(Continued)

OTHER PUBLICATIONS

Miller, Jacob, "Inter-Active Graphic Methods For Automating Mechanical Engineering Design and Analyses", Proceedings of the 17th Conference on Design Automation, pp. 114-128, 1980.*

(Continued)

*Primary Examiner*—Paul L Rodriguez
*Assistant Examiner*—Mary C Jacob
(74) *Attorney, Agent, or Firm*—Drinker Biddle & Reath LLP (57) ABSTRACT

A method for assessing the integrity of a structure, comprising the steps of: i) collecting data relating to the initial dimensions of the structure, ii) creating a computer model of the structure, iii) collecting data relating to the estimated load on the structure, iv) analysing the structure, using the computer model of the structure and the load data, in order to define areas which are subject to relatively high stress, v) measuring, after a time interval, the dimensions of the structure in high stress areas, vi) updating the computer model of the structure, using the results of step v), re-analysing the structure, using the updated computer model and the load data, in order to calculate a value for the integrity of the structure.

18 Claims, 5 Drawing Sheets

U.S. PATENT DOCUMENTS

| | | | | |
|---|---|---|---|---|
| 5,195,046 | A * | 3/1993 | Gerardi et al. | 702/35 |
| 5,210,704 | A * | 5/1993 | Husseiny | 702/34 |
| 5,867,977 | A * | 2/1999 | Zachary et al. | 60/39.53 |
| 6,047,241 | A | 4/2000 | Sparago | 702/34 |
| 6,134,485 | A | 10/2000 | Tanielian et al. | 701/14 |
| 6,285,320 | B1 * | 9/2001 | Olster et al. | 342/464 |
| 6,341,258 | B1 | 1/2002 | Inoue et al. | 702/56 |
| 6,678,403 | B1 * | 1/2004 | Wilk | 382/152 |
| 6,697,770 | B1 * | 2/2004 | Nagetgaal | 703/2 |
| 6,955,100 | B1 * | 10/2005 | Barich et al. | 73/865.8 |
| 7,082,338 | B1 * | 7/2006 | Chen et al. | 700/31 |
| 2001/0040997 | A1 | 11/2001 | Tsap et al. | 382/154 |

FOREIGN PATENT DOCUMENTS

| | | |
|---|---|---|
| GB | 2021261 | 11/1979 |
| WO | 02-01172 | 1/2002 |

OTHER PUBLICATIONS

Knapp et al, "Finite Element Stress Analysis of Cables", Oceans '99 MT S/IEEE, Riding the Crest Into the 21 st Century, vol. 2, pp. 1026-1033, Sep. 1999.*

Carter et al, "Automated 3-D Crack Growth Simulation", International Journal for Numerical Methods in Engineering, 47, pp. 229-253, 2000.*

Brooks et al, "Integrating Real Time Age Degradation Into the Structural Integrity Process", RTO AVT Workshop on "Fatigue in the Presence of Corrosion", Corfu, Greece, Oct. 7-8, 1998.*

Hajela et al, "Structural Damage Detection Based on Static and Modal Analysis", 30th AIAA, ASME, ASCE, AHS, and ASC, Structures, Structural Dynamics and Materials Conference, 1999, pp. 1172-1182.*

* cited by examiner

Fig. 1

Client - IDEAS Ltd

System - VECTOR

Subject - Sample Report - First Stage Separator    Date - 04/03/02

| Factor | Value | Units |
|---|---|---|
| Safe Combined Working Pressure | 38.13 | Barg |
| Individual Flaw Maximum Pressure | 35.72 | Barg |
| Individual Flaw group Maximum Pressure | 32.12 | Barg |
| Estimate of Tolerable Flaw Size | 4.51 | mm |
| Number of Fatigue Cycles to Date | 1.09E+11 | Cycles |
| Number of Fatigue Cycles remaining | 4.47E+09 | Cycles |
| Current Corrosion Rate | 0.97 | mm/year |
| Number of Fatigue Days remaining | 1.03E+03 | Days |
| Number of Fatigue Years remaining | 2.83 | Years |
| Days until Inspection & NDT required | 517.36 | Days |
| Years until Inspection & NDT required | 1.42 | Years |
| Days until Remedial Action requires | 724.31 | Days |
| Years until Remedial Action requires | 1.98 | Years |
| Current Safety Factor | 2.14 | |
| Current Risk Factor | 0.47 | |
| | | |

System is Fit for Purpose until Inspection & NDT Required

METHOD FOR ASSESSING THE INTEGRITY OF A STRUCTURE

FIELD OF THE INVENTION

The present invention relates to a method for assessing the integrity of a structure. The method according to the present invention involves the measurement of the dimensions of the structure and the loading and thereafter analysing the results of those measurements in order to calculate a value for the integrity of the structure.

BACKGROUND

In the process industry, one of the biggest sources of failures and shutdown for process plants is in pressurised piping and vessel systems. In the prior art, systems are known which monitor and assess plants in order to be able to predict a failure. According to the prior art, the wall thickness of structures, such as piping, is simply monitored in order to perform simple calculations and to predict a trend, for instance in the wear and/or the corrosion of such a structure. Alternatively, machinery-based corrosion and vibration monitoring systems are used. These systems are grossly inaccurate as over 85% of failures occur at non-straight pipe areas, due to structural loadings, corrosion/erosion, fatigue, pulsation or vibration ("Hydrocarbon" magazine). The monitoring and assessment technologies according to the prior art are based on "risk analysis". These systems use probability to estimate failure, and in doing so predict suitable inspection intervals. An important disadvantage of such an approach is that these systems do not use real-time measurements in order to calculate real-time load and load changing mechanisms.

A system for monitoring a pipe segment for instance is known from the European Patent Application EP 0358994. The method according to EP 0358994 is adapted to measure a corrosion/erosion trend. The system is confined to the change in the main pipe wall thickness to predict the future thickness of the pipe wall. According to this document the emphasis is on measuring the corrosion/erosion rate and using statistical techniques to predict future rates and trends. The estimated stress in a pipe wall is calculated using the following equation:

$$\text{Stress} = \frac{\text{pressure} \times \text{radius}}{\text{thickness}} \times \text{estimated factor}$$

This equation only calculates pressure loading in straight pipes. No other loadings are considered. As the thickness decreases there is a danger of pipewall rupture. Therefore the information is used in order to predict the maximum time interval before the next inpection of the pipe welds. The information collected according to EP0358994, in practice, is not very helpful, as very few plant failures are caused by main pipewall rupture. This means that the information collected by means of EP0358994 has only limited value.

U.S. Pat. No. 4,852,397 discloses a procedure for measuring material properties of a structure. The method is used to test the material properties of a failed structure. The results are used to determine if the remaining structure is safe to dismantle or even partially remain in service. This system does not indicate in any way, how to measure the loads or geometry of any system, let alone how to further predict the integrity of such a structure. This method can only be used as a destructive method of determining material behaviour such as a Stress-Strain Curve and Fracture Toughness.

US-2001-040997 discloses a method for tracking moving objects such as skin. It is designed for Motion Tracking and bears no relevance to Integrity Monitoring. The fact that it uses a Finite Element Analysis technique is irrelevant because this method is used for many applications. The iterative approach used according to D2 is to re-mesh the Finite Element Model to simulate the skin motion and is an iterative approach so as to allow the mesh to move, thus tracking the motion. It is not modelling a whole structure. It is not modelling any loadings that would be relevant, nor does it measure systems characteristics and use these to predict its Integrity. It simply teaches that a localised Finite Element Grid can be used to track motion.

Additionally, according to the prior art it is known to use acoustic pulsation, vibration and condition monitoring in order to monitor and assess the integrity of a structure. The disadvantage of those techniques is the fact that those techniques are both specialist tasks and extremely expensive. Because of the high costs involved with those techniques normally these techniques are only undertaken if failure is expected or has occurred.

SUMMARY OF THE INVENTION

In view of the disadvantages and limitations of the methods for assessing the integrity of a structure according to the prior art, it is an object of the present invention to provide a method according to the introduction wherein load-changing mechanisms and dimension changing mechanisms, as they occur, are taken into account in the calculations of the integrity of the structure.

To obtain these objects, the method according to the present invention comprises the steps of:
  i) collecting data relating to the initial dimensions of the structure,
  ii) creating a computer model of the structure,
  iii) collecting load data relating to the estimated load on the structure,
  iv) analysing the structure, using the computer model of the structure and the load data, in order to define areas which are subject to relatively high stresses,
  v) measuring, after a time interval, the dimensions of the structure in high stress areas,
  vi) updating the computer model of the structure, using the results of step v),
  vii) re-analysing the structure, using the updated computer model and the load data, in order to calculate a value for the integrity of the structure.

In the present description the wording "computer model" is used. The wording "computer model" refers to a data set representing a structure, which data set can be analysed by means of an appropriate finite element analysis technology. By means of this finite element analysis technology the strains and stresses occurring in the structure can be calculated.

In the present description reference is made to "a value for the integrity of the structure". The wording "value for the integrity of a structure" refers to whether a structure is "fit for service" or not. When the value for the integrity of a structure is calculated, it is assessed whether the structure is fit to perform its normal tasks. That means that the value for the integrity of a structure can refer to a minimum wall thickness, a maximum stress in the material of the wall, a maximum strain in the material of a wall, or similar feature.

According to the present invention data relating to the initial dimensions of a structure are collected. These data are used to create a computer model of the structure. That means that it is possible to use a finite element method in order to calculate strains and stresses in the structure. Thereafter data is collected relating to the estimated load on the structure. By means of the finite element method the structure can then be analysed, using both the computer model and the load data. The result of this analysis is that individual areas can be defined which are subject to relatively high stresses. Because of the fact that the high stress areas are identified, it is clear in which areas of the structure future problems can be expected.

If the results of the analysis of the structure reveal that the strains and stresses in the structure are within safety limits, the structure thereafter can be used for its normal purpose. After a set time interval the dimensions of the structure will be measured in the high load areas. Because of the fact that high load areas have been defined, the amount of measurements can be limited. That means that the actual measurement of the dimensions of the structure in the high load areas involves relatively limited effort.

Using the measured dimensions of the structure it is then possible to update the computer model and to re-analyse the structure. This calculation will result in an updated value for the integrity of the structure. This means that the method according to the present invention presents an efficient and effective method for assessing the integrity of a structure.

According to the present invention the method may further comprise the step of:

viii) repeating one or more times steps v), vi) and vii).

According to the present invention it is possible to continuously measure the dimensions of the structure in high load areas. Steps v), vi) and vii) can be repeated after a set time interval, which time interval may be dependent on the calculated value for the integrity of the structure in a former analysis.

According to the present invention the method may comprise the further step of:

ix) visualising the results of vii).

The method according to the present invention is suitable for continuously assessing the integrity of a structure. In order to facilitate the review of the outcome of the assessment, the results of the calculations leading to the value for the integrity of the structure can be presented, for instance, in a table. This table can be presented to a plant manager who thereafter can take necessary actions, if needed.

According to the present invention the method may comprise the further steps of:

x) measuring the actual load on the structure,
xi) updating the data relating to the load on the structure, and thereafter
xii) re-analysing the structure, using the computer model and the updated load data, in order to calculate a value for the integrity of the structure.

The method according to the present invention cannot only be used for assessing the actual dimensions of the structure, the method is also suitable for measuring the actual load on the structure and using the results of those measurements in order to refine the calculations of the value for the integrity for the structure.

According to the present invention the method may comprise the further step of xiii) repeating one or more times steps x), xi) and xii).

Moreover, the method may comprise the further step of:

xiv) visualising the steps of step xii).

According to the present invention it is advantageous that the method comprises the steps of installing, after step iv), in high stress areas, a first set of sensors for measuring the dimensions of the structure in said high stress areas. Moreover, it is advantageous that the method comprises the step of installing, after step iv), in high stress areas, a second set of sensors for measuring the load on the structure in said high stress areas.

The advantage of these measures is the fact that the data relating to the dimensions of the structure and the actual load on the structure can be collected automatically. In order to process the collected data in real-time it is an advantage that the method comprises the step of connecting the sensors to processing means, such as a computer, for transmitting data from the sensors to the processing means in real-time.

The method according to the present invention can be used for new systems. The method, however, is also suitable for structures which already have been used during a certain time frame. In those cases it is advantageous that the method comprises the step of prior to step iv), collecting data relating to known defects of the structure and thereafter using said defect-data, the computer model of the structure and the load-data for defining areas which are subject to relatively high loads.

By adding the data relating to known defects of the structure the calculation of high load areas in the structure can be refined. Deterioration and growth of the defects can then be measured and analysed.

In case there are no known defects, it is possible that the method comprises the step of prior to step iv), estimating the minimum size of defect in the structure and thereafter using said estimated defect-data, the computer model of the structure and the load-data for defining areas which are subject to relatively high loads. Moreover, it is possible that the minimum size of the defect is estimated to be equal to the precision the measurement equipment, used for measuring the dimensions of the structure.

When the structure, to be analysed, is used for a certain time period, and the load history on the structure is known, it is possible that the method comprises the step of prior to step iv), collecting data relating to the load-history on the structure and thereafter using said load-history, the computer model of the structure and the load-data for defining areas which are subject to relatively high loads. Using this extra step of collecting data relating to the load-history means that initial calculations of high-load areas can be refined.

The invention also relates to a processing arrangement for assessing the integrity of a structure, provided with processing means, such as a computer, for using data relating to the dimensions of the structure and the load on the structure in a calculation of a value representing the integrity of the structure, wherein the processing arrangement is provided with sensors to measure data relating to the dimensions of the structure and the load on the structure, the sensors being adapted to transmit said data in real-time, wherein the processing means are provided with receiving means for receiving said data and wherein the processing means are adapted to analyse the data in order to update the calculation of the value representing the integrity of the structure.

Preferably the processing arrangement is provided with representation means for visualising the results of the calculation of the value for the integrity of the structure.

According to the invention it is possible that the sensors used in the processing arrangement are adapted to measure pressure exerted on the structure, environmental loads, temperature, mechanical loading on the structure, fluid loading on the structure, vibration or acceleration experienced by the structure.

The invention also relates to a structure, such as a plant, provided with a processing arrangement as described above.

The method according to the present invention can be entirely controlled by a suitable computer program after being loaded by the processing arrangement. Therefore, the invention also relates to a computer program product comprising data and instructions that after being loaded by a processing arrangement provides said arrangement with the capacity to carry out a method as defined above.

Also a data carrier provided with such a computer program is claimed.

BRIEF DESCRIPTION OF THE DRAWINGS

Below, the invention will be explained in detail with reference being made to the drawings. The drawings are only intended to illustrate the invention and not to limit its scope which is only defined by the dependent claims.

DETAILED DISCUSSION OF THE DRAWINGS

Figure 1:
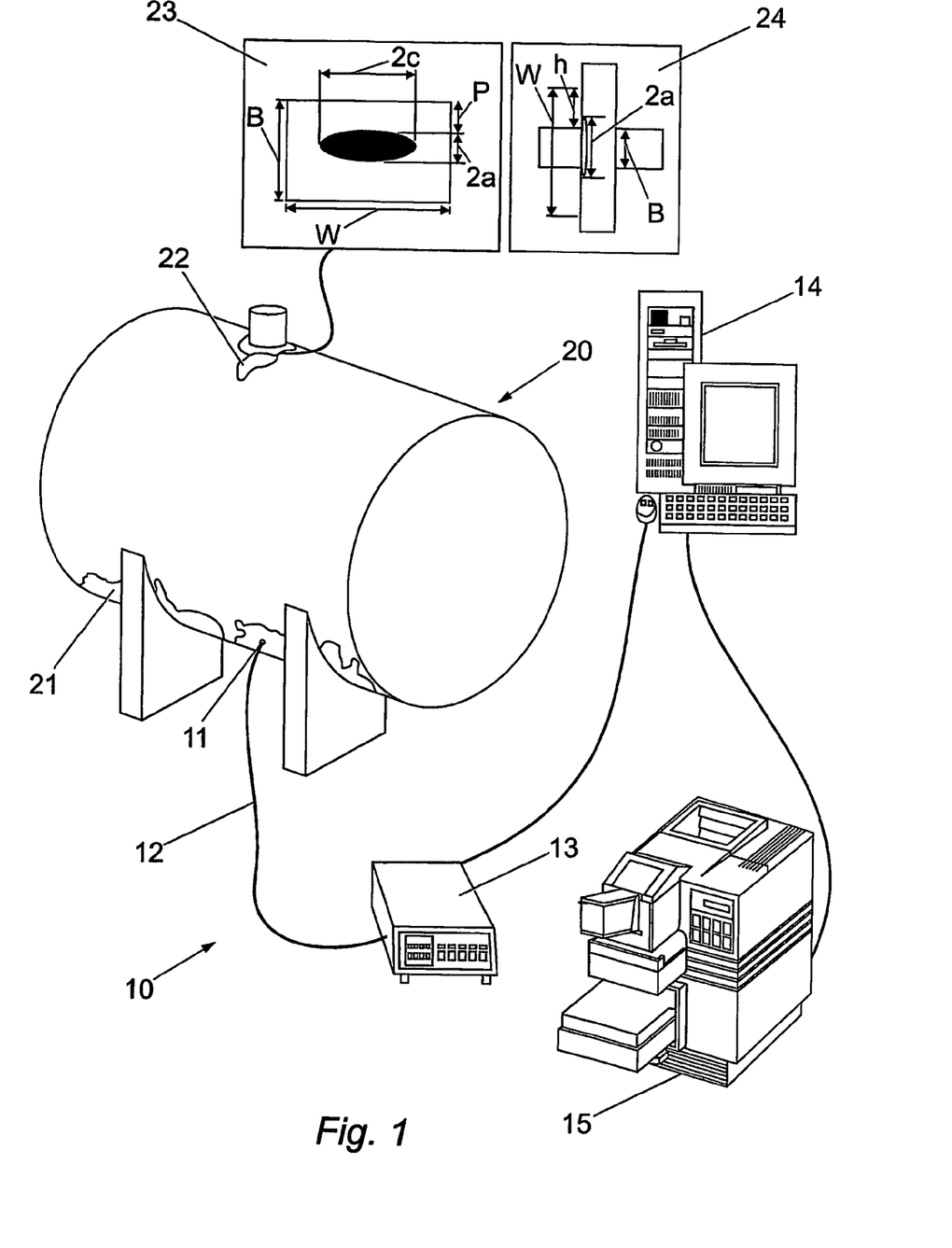
FIG. 1 shows a schematic overview of a processing arrangement for assessing the integrity of a vessel.

In FIG. 1 a schematic overview is shown of a processing arrangement 10 for assessing the integrity of a vessel. In order to assess the integrity of the vessel 20, at an initial stage a computer model will be created representing the dimensions of the vessel 20. When creating said computer model the presence of corroded areas 21 and the presence of flaws, pits and cracks 22 can be taken into account. The processing arrangement 10 comprises sensors 11 which are installed in high load areas of the vessel 20. In FIG. 1 only one sensor is shown. In practice, several sensors will be installed in order to allow a good overview of the condition, strains and stresses in the vessel 20. The sensor 11 by means of a line 12 is connected to a data logger 13. The data logger 13 is connected to processing means 14, such as a computer. The computer 14 is provided with suitable software in order to process the data generated by the data logger 13. A possible architecture for the software to be used in the computer 14 is described with reference to FIG. 3. By means of the sensor 11 the actual dimensions of the vessel 20 and the load exerted on the vessel can be continuously measured and can be forwarded to the computer 14. The updated information sent to the computer 14 can be used to constantly reanalysis the structure and recalculate values for the integrity of the structure.

The results of the calculations can be visualised, for instance by means of a document centre 15. The document centre 15 can be used, for instance, for printing tables and overviews (see FIG. 2), in order to inform the responsible plant manager.

In FIG. 1 reference numbers 23 and 24 are used for a graphic representation of flaws, pits and cracks which can be present in the vessel wall. During the lifetime of the vessel the actual size of such flaws, pits and cracks(in 3-d) will be used in calculations of the value for the integrity of the structure. That means that according to the present invention no estimations of trends are used. The actual sizes $2a$, $2c$, B, W, P, h of the flaws, pits and cracks in the system will be used when calculating the representative value for the integrity of the structure.

According to the present invention it is possible to add a warning system. This warning system could produce a warning when the value for the integrity of the structure drops below a specific predetermined level. It is also possible to indicate on a visual representation the value for the integrity of the structure has dropped below a certain mimimum.

Figure 2:
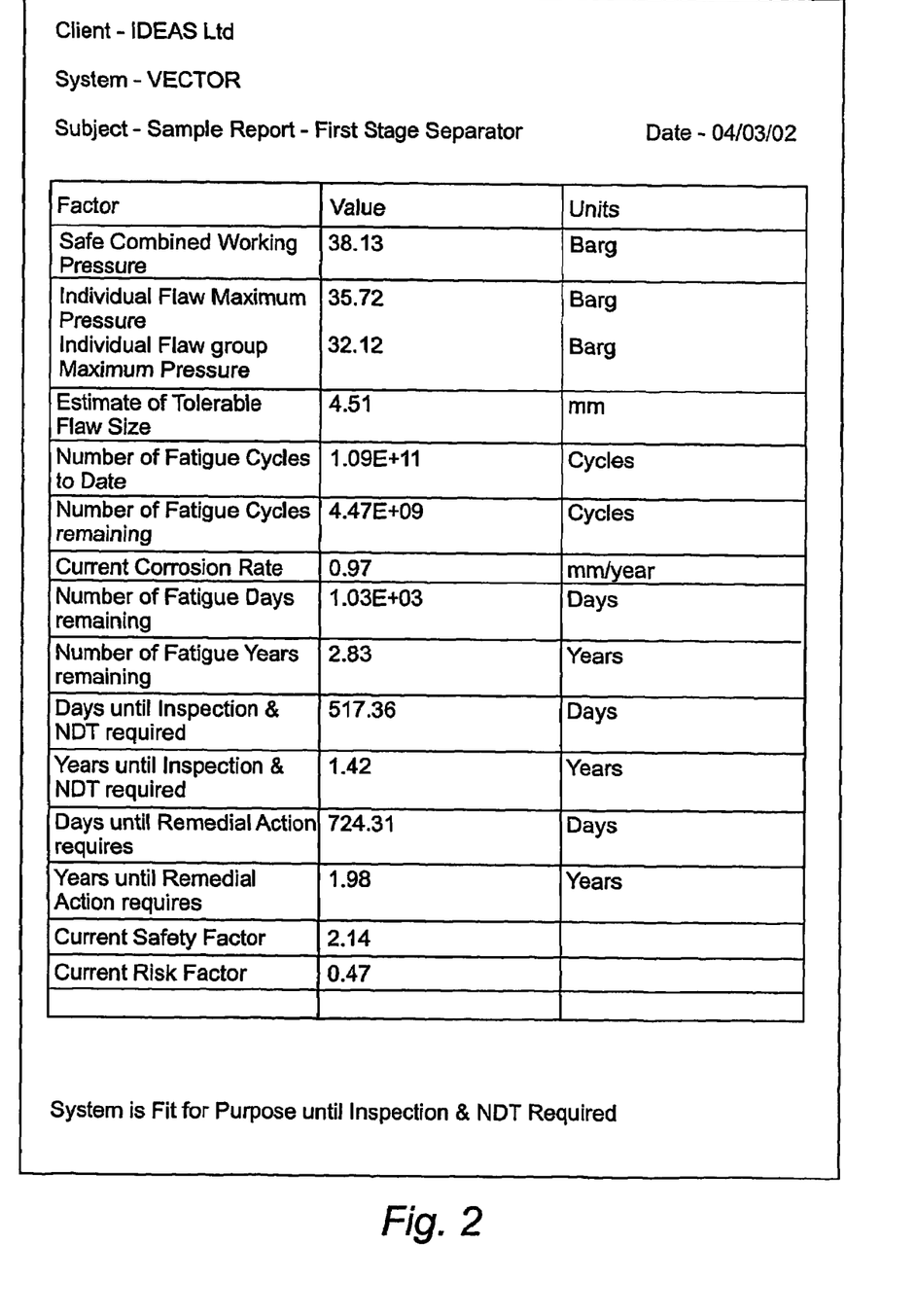
FIG. 2 shows a visual representation of the calculations of a value for the integrity of a structure.

In FIG. 2 a possible outcome of the calculations are shown. According to the requirements of a user, the outcome of the calculations provides information on, but not limited to, the working pressure inside the vessel, the number of fatigue cycles to date, the number of fatigue cycles remaining, current corrosion rate, date until inspection is required, the current safety factor, current risk factors, etc. The visual representation of the outcome of the calculations of the value for the integrity of the structure can be tailored upon a user's request. The visual representation according to FIG. 2 provides a plant manager with a user-friendly overview of the integrity of a structure.

Figure 3:
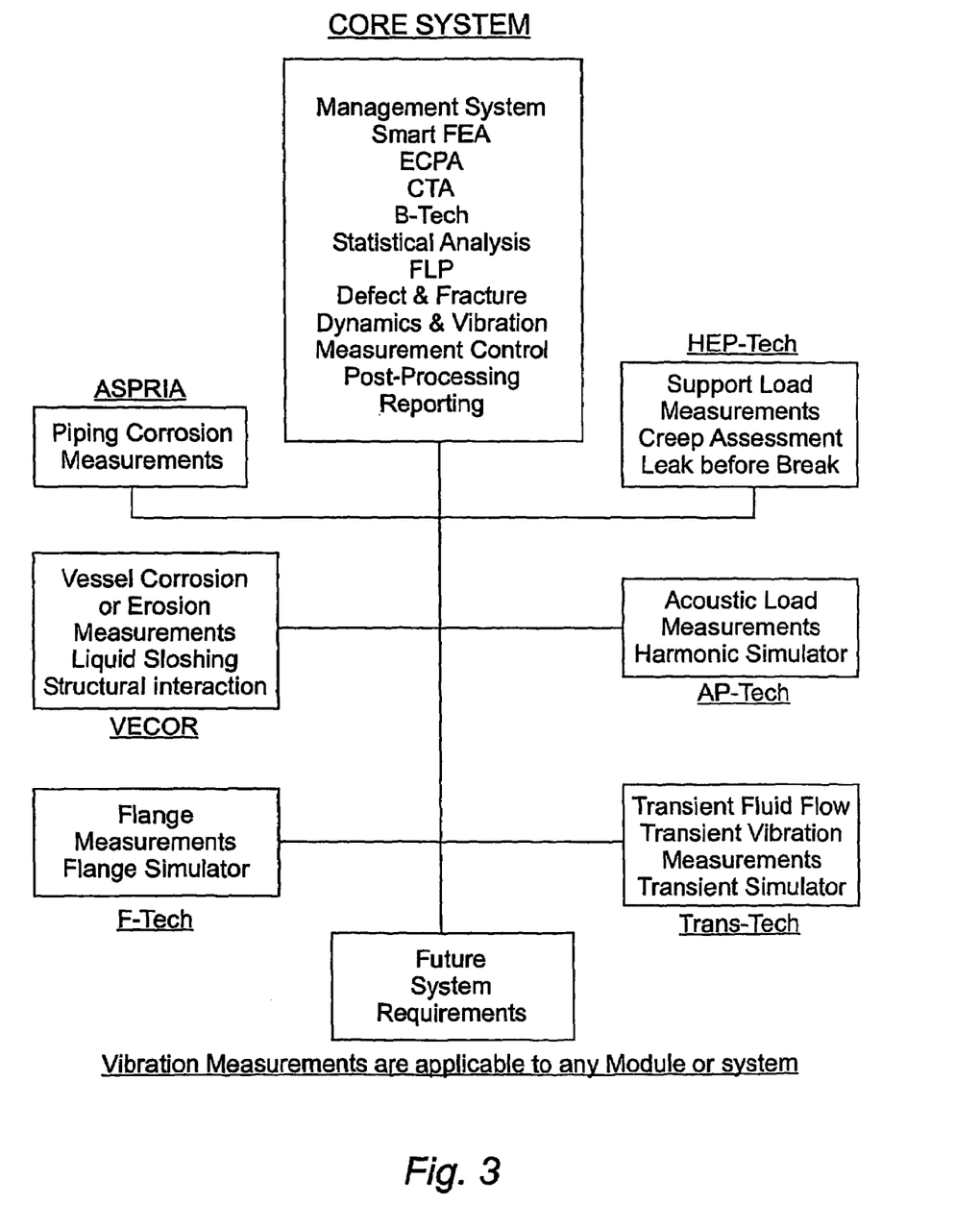
FIG. 3 shows a schematic overview of the software used according to the present invention.

In FIG. 3 a schematic overview is given of a software program which can be used in the method and processing arrangement according to the present invention. Because of the fact that the software module provides an analysis system for plant real-time integrity assessment, the software module could be referred to as "Aspria". The software system is built up from several modules. The overall system will be referred to as "Integri-TECH".

The layout of the software system is shown in FIG. 3. The central part of the system is a so-called management system or core system. The core system manages and controls the components and will produce the visual representation as shown in FIG. 2. The core system enables the different modules to work together in order to produce a single outcome, representing the integrity of a structure.

The core system comprises an analysis tool (Smart FEA), which is a program based on finite element analysis technology. This module includes advanced error estimation techniques. The module contains the "as-built"model of the structure to be analysed, plus components and receives the regular measurement data. When receiving the measurement data this module will update the finite element model and will perform an advanced finite element analysis and thereafter passes the results to further modules.

The core system also comprises a module for assessment of a corrosion patch. This module can be referred to as "envelope corrosion patch assessment" (ECPA), which has been derived to assess the effects of patches of corrosion in the various regions of each structure to be analysed. The module generates an envelope of possible conditions that will allow the system to predict the earliest possible danger signs for each structure. The corrosion patches can be located and automatically updated every time a corrosion measurement is taken or can be automatically generated from measurement data, adaptively meshed and can be dynamically positioned anywhere on the structure to be analysed for detailed finite element analysis. The results of the analysis are modified to account for the most likely severe and emerging patch shape and where the results are becoming nearer to limiting values, recommendations are passed back through the system in order that the finite element analysis can modify the finite element mesh in order to re-analysis the system whereby the corrosion patches are included.

The core system further comprises a corrosion trending analysis (CTA). This modules analyses the history and trends and the future effects of corrosion and erosion in the system. This module moreover builds up on a history of the effects and derives continually updating correlations to predict corrosion rates, patterns, etc in order to be used in a further statistical analysis module.

In case the structure to be analysed is in a high temperature area, for instance in high energy piping systems, a creep assessment system (CAS) can be used. This module will analyse the temperature and time history of a certain structure. Thereafter a creep analysis of the system will be carried out to simulate the stress changes due to time dependent temperature effects in the piping system and will build up a history of the effects and derive continually updating correlations to predict creep rates, patterns etc for the statistical analysis module.

In case the structure to be analysed is subject to acoustic pulsation, such as in gas compression systems, a further harmonic-acoustic simulator (HIS) can be used. This modules analyses the acoustic pulsations in the system by harmonic analysis to simulate the stress changes due to acoustic pulsations in the piping system. The history is then stored and trends are predicted for the future effects of acoustic pulsations in the system and the system builds up a history of the effects and derives continually updating correlations to predict cyclic stress patterns. These cyclic stress patterns can be used in a statistical analysis module.

In case the structure to be analysed is subject to transient fluid flow conditions, such as in pumping systems, the core system moreover uses a transient simulator (TS). This module analyses the transient fluid flow effects in the system by time history analysis to simulate the stress changes due to transient fluid flow effects in the piping system. The history is then stored and trends predicted for the future effects of transient fluid flow effects in the system and the system builds up a history of the effects and derives continually updating correlations to predict cyclic stress patterns. These cyclic stress patterns can be used in a statistical analysis module.

The core system moreover comprises a statistical analysis module. This module takes all of the piping system loading history, cyclic patterns, operational data, corrosion and erosion and B-Tech vibration data and trends. These data then are statistically analysed to provide realistic and meaningful loading for first time history data for the defect and fracture module. The same information can be used in a fatigue life prediction module to predict the remaining lifetime of the structure before shutdown or failure. Standard statistical analysis is then employed in the system.

The core system moreover is provided with a module, adapted to receive "live measurements", including frequency data, measured live by accelerometers, at small bore branch connections. This module is referred to as "B-Tech. The B-Tech part of the system then performs extensive mathematical correlations, algorithms and techniques to predict the effect of the vibration and more importantly to predict the fatigue life for the analysed structure automatically from the measured data. The module, if needed, can alert the user and can prevent failure. Another important part of this module is that the module isn't only capable of predicting the fatigue life from vibration, but will also predict which vibration excitation will cause problems for each particular arrangement and will indicate these vibration excitation if that level of vibration is detected.

Results of these calculations will then be passed to a further defect and fracture and FLP modules.

The core system moreover is provided with a liquid sloshing simulator. This module performs the simulation and assessment of liquid sloshing that can take place when a vessel is located on a moving object, such as a ship. Such liquid sloshing is very detrimental to the integrity of the vessel and can be catastrophic. Therefore it is most important to assess the exact effects of the sloshing on the integrity of the vessel. The liquid sloshing simulator is adapted to simulate sloshing and to predict the interaction of the sloshing with the pressure vessel or a ship wall. The response of these loadings to the ship (or a vehicle) motion is measured and the cyclic loading pattern is generated and passed through the finite element analysis system for dynamic stress analysis. This analysis is followed by a defect and fatigue analysis in order to verify the integrity of the structure.

The core system moreover comprises a defect and fracture module. This module performs the fracture mechanics assessment. The system is adapted to monitor, analyse and assess the growth of any defect in the structure. The system integrity is then quantified in respect of limiting crack and flaw sizes that will affect the integrity. The location, size and type of any possible defect or arrangement of cumulative defects can be assessed and also postulated defect assessments can be carried out. For instance, every well in a structure, is assessed and every range of defects is assessed at every weld.

A further module present in the core system is the fatigue life prediction module (FLP). This system performs the fatigue life predictions.

The core system manages the various modules which are shown in FIG. 3. The specific features of those six modules will be described below.

Aspria (analysis system for plant real time integrity assessment) is an analysis, monitoring and assessment system that can be connected to any pressurised plant or structural system than can deteriorate by erosion, corrosion or general time/operation exposure and/or vibration. This module quantifies the system's integrity, assesses the effects of all loadings, stresses, defects and predicts inspection and repair intervals as well as plant life and safety. This is all done "on-line", "live" or as "continuous monitoring system".

The Aspria module constantly measures geometric thickness values in piping systems effected by corrosion, erosion, vibration, etc. A detailed geometric update is performed and the unit, whether a piece of plant, such as pipework, a structure or similar, will undergo an automatic and complete finite element stress analysis using for instance Smart-FEA (see above) and advanced error estimation techniques to determine the degree of accuracy. Defects, cracks or corrosion patches will be thoroughly analysed automatically and a system fatigue life automatically calculated. This will lead to prescribed inspection and repair intervals, and a quantified plant life. All loadings, including process, mechanical and environmental loadings, will be included in the assessment. If the structure is used on a ship, the loading will include sea motion.

The second module which can be used in the software is Vecor (vessel corrosion analysis system for plant real time integrity assessment). Vecor is an analysis, monitoring and assessment system that can be connected to any pressure vessel, tank or storage system which can deteriorate by erosion, corrosion or general time/operation exposure and/or vibration. The system includes FPSO and ship movements and the liquid sloshing and fluid structural interaction effect of vessels on ships. Moreover Vecor will include acceleration effects. It quantifies the system and integrity, assesses the effects of all loadings, stresses defects etc and predicts inspection and repair intervals as well as plant life and safety. This is all done "on-line", "live" or as a continuous monitoring system. The Vecor system will constantly measure geometric thickness values in pressure vessels, exchangers and tanks affected by corrosion, erosion, vibration etc. Another item that Vecor can measure is the motion of a ship or a platform. A detailed geometric and loading update will then be performed and the structure will undergo an automatic and complete finite element stress analysis using for instance Smart-FEA (see above) and advanced error measurement techniques in order to determine the degree of accuracy. Liquid sloshing effect within the vessel will be simulated and assessed if appropriate (that means when a ship pitches, heaves and rolls).

Interaction effects of the liquid sloshing and the vessel structure response will also be assessed. Defects, cracks or corrosion patches will be thoroughly analysed automatically and a system fatigue life automatically produced. This will lead to prescribed inspection and repair intervals, plus quantified plant life. All loadings, including process, mechanical and environmental loadings will be included in the assessments, including (if appropriate) sea motion.

A further module to be used in the system is HEP-TECH (high energy piping technology). HEP-TECH is an analysis monitoring and assessment system which can be connected to high energy or high temperature piping systems in power stations or other markets, where deterioration by creep, support load variation, load and stress redistribution, high temperature effects or general time/operation exposure and/or vibration occurs. It quantifies the system integrity, assesses the effects of all support behaviour, loadings, stresses, defects and predicts inspection and repair intervals as well as plant life and safety. This is all done "on-line", "live" or as "continuous monitoring system. The HEP-TECH will constantly measure support load values effected by deterioration and load redistribution due to high temperatures of creep. A detailed load update will then be performed and the pipework will then undergo an automatic and complete finite element stress analysis and advanced error estimation techniques to determine the degree of accuracy. The system will be assessed and the load corrections required highlighted for adjustments, which should be made to ensure piping and structural integrity. Defects, cracks or potential areas for such will be thoroughly analysed automatically and the system fatigue life will be produced automatically. This will lead to a prescribed inspection and repair intervals, plus quantified plant life. The assessments will include all loadings such as process, mechanical and environmental loadings. The potential for "leak before break" will also be assessed.

A further module is the AP-Tech (acoustic pulsation technology). AP-Tech is an analysis, monitoring and assessment system to monitor, predict, similate and assess the effects and levels of acoustic energy waves and frequencies in process plant piping systems. It also assesses the levels of dynamic excitation and vibration of the piping system but also has a module to prevent and identify a solution to the majority of small bore bench connection stress, vibration and fatigue problems. AP-Tech quantifies the piping system integrity, assesses the effects of all pulsation and piping behaviour, dynamic and fluid loadings, stresses, defects and small bore branches and predicts inspection and repair intervals as well as plant life and safety. These are all done "on-line", "live" or as a "continous monitoring system". The AP-Tech system would constantly measure life acoustic pulsation pressure waves and the associated frequency and vibration values effected by acoustic pulsation and vibration, etc. The detailed dynamic loading update will then be performed and the pipework will undergo an automatic and complete dynamic finite element stress analysis. Moreover, error estimation techniques will be used in order to determine the degree of accuracy. AP-Tech will use either a pressure transducer or a non-intrusive method to measure acoustic pulsations. The system will be dynamically assessed, the acoustic pulsation simulated and the acoustic-dynamic-vibration load cycle pattern and subsequent fatigue life will be determined. A computational fluid dynamic similator will optionally be attached to allow a user to "visualise" the acoustic pulsation behaviour of the system. All necessary timescales and indications of work areas required will be produced "automatically which should be made to ensure piping and structural integrity. Defects, cracks or potential for such will be thoroughly analysed automatically and the system fatigue life will be produced automatically, which will lead to prescribed inspection and repair intervals, plus a quantified plant life. All loadings, including process, mechanical, pulsation, acoustic, vibration and environmental loadings will be included in the assessment.

A further module to be used in the system is F-Tech. This is a module which provides beneficial analysis and monitoring and assessment for the majority of piping and vessel-tank flange connections. The problems to monitor involve stress, vibration, leakage and fatigue. F-Tech quantifies the flange joint integrity, assesses the effects of all flange loadings, gaskets, bolts, stresses and predicts inspection and repair intervals as well as plant life and safety. This is all done "on-line", "live" or as "continuous monitoring" system. F-Tech will provide a detailed geometric update of the monitored area and then the area will undergo an automatic and complete finite element stress analysis and advanced error estimation techniques to determine the degree of accuracy. Flange displacement and rotation will be assessed along with gasket seating pressure in a live and automatic mode. This will be thoroughly analysed "automatically" and the system fatigue life, joint relaxation plus potential for joint leverage will be automatically produced. This will lead to prescribed inspection and repair intervals, plus quantified plant life. All loadings including process, mechanical and environmental loadings will be included in the assessment.

A further module to be used is called Trans-Tech. This module is adapted to monitor, predict, similate and assess the effects of the majority of piping transient events such as fluid transient and energy waves and frequencies in process plants piping systems. It also assesses the levels of dynamic excitation and vibration of the piping system. Moreover, Trans-Tech has a module to prevent and identify a solution to the majority of small bore branch connections stress, vibration and fatigue problems. Trans-Tech quantifies the piping system integrity, assesses the effects of all fluid transient and piping behaviour, dynamic and fluid loadings, stresses, defects, small bore branches and thereafter predicts inspection and repair intervals as well as plant life and safety. This is all done "on-line", "live" or as a "continuous monitoring" system. A computation fluid dynamic simulator will optionally be attached to allow clients to visualise the acoustic pulsation behaviour of the system. All necessary timescales and indications of work areas required will be produced automatically which should be made to ensure piping and structural integrity.

All six modules, described above, have the option of utilising accelerometers to include the effects of system vibration. All systems have preset intervals for the automatic measurement readings and subsequent re-analysis. This is determined by the user and could be adapted in order to analyse and measure every hour all day, or any other time interval. The cost of the modular architectural software the Integri-Tech system can be set up for any structure, any piece of plant, pressure vessels, equipment, civil buildings, structures, ships and buried pipes.

In order to collect the data to be processed by the software as described above the processing arrangement according to the present invention uses measurement hardware components which will include:

Ultrasonic thickness, ultrasonic blanket thickness measuring devices, accelerometers, data transmittal devices, data interface devices, acoustic measurement systems, pressure transducers, non-intrusive PVDF systems, pipe support load measurement cells, strain gauges, ground settlement gauges, gyroscopes and ship-vehicle motion devices, acoustic emission systems, patch corrosion measurement devices, radiography interfaces, MAP scan interfaces, intelligent pigging interfaces, and crack growth measurement devices.

The advantages of using the system according to the present invention include:

The generation of information to protect inspection and remedial action plans. Since all necessary information on the critical areas of a structure are known, the use of the system will lead to a reduction of risks and a reduction of inspection costs. Moreover, the system provides real time information on the integrity of the system, which enables prompt action if required.

Figure 4:
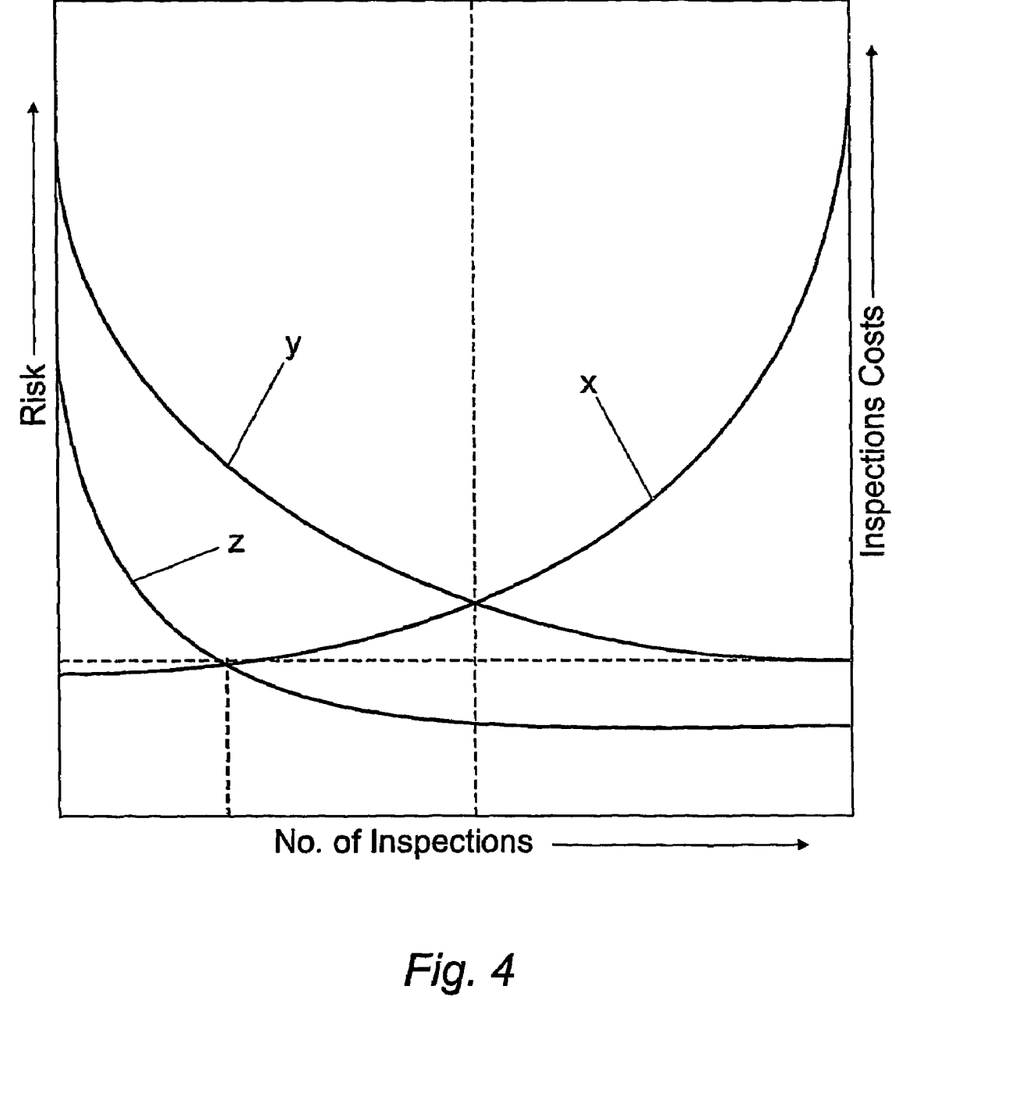
FIG. 4 shows a diagram indicating the relation between inspection costs, the number of inspections and the corresponding risk.
Figure 5:
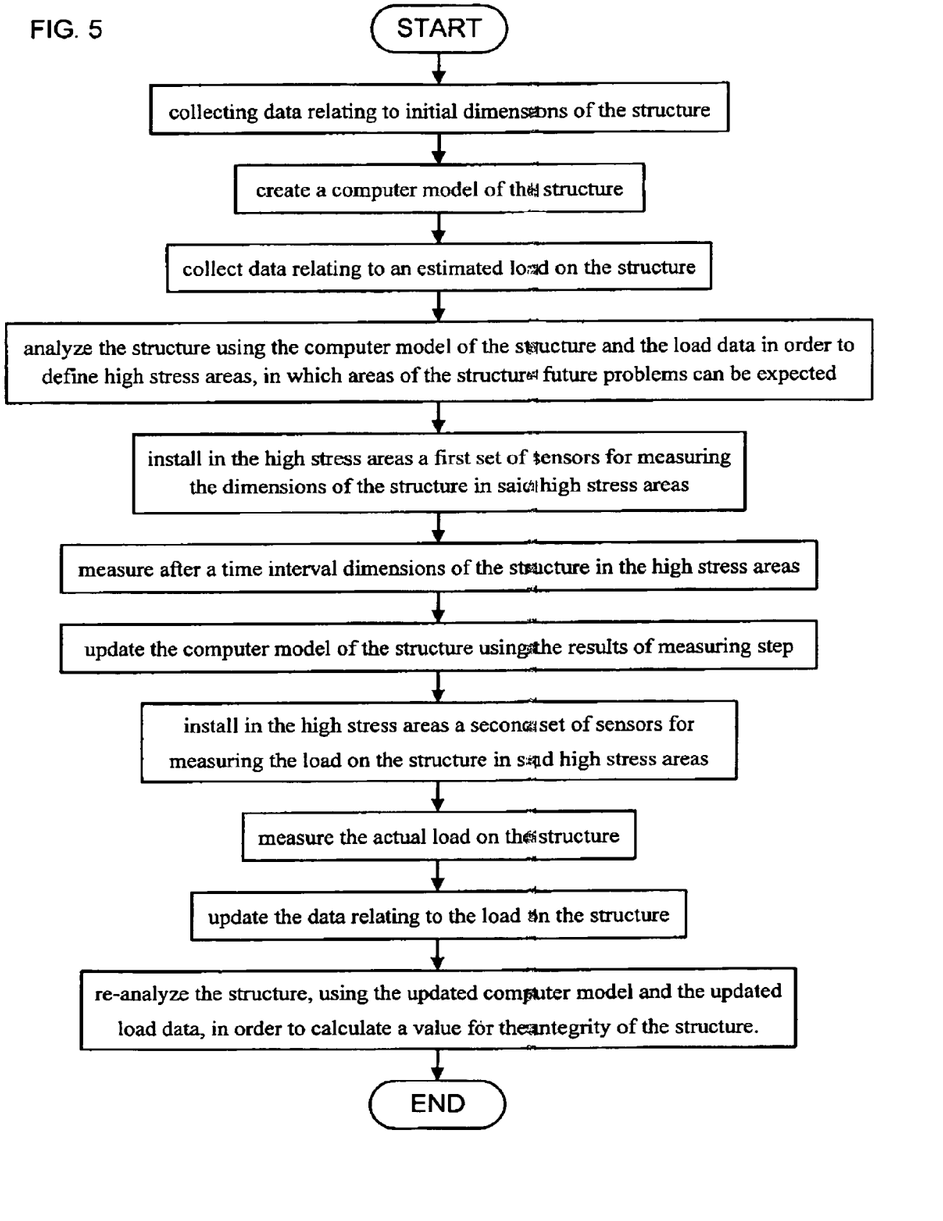
FIG. 5 shows a flow chart illustrating an embodiment of a method for assessing the integrity of a structure.

In FIG. 4 the possible advantages of the system according to the present invention are shown. Line X represents the amount of costs involved with a respective number of inspections. Line Y represents the relation between possible risks and the number of inspections. Line Z represents a modified relation between risks involved and the number of inspections when using the system according to the present invention.

FIG. 4 shows that using the system according to the present invention will lead to a lower level of risk, while at the same time the number of inspections (meaning the costs involved as inspections) will decrease.

The invention claimed is:

1. Method for assessing the integrity of a structure, comprising the steps of:
   i) collecting data relating to initial dimensions of the structure,
   ii) creating a computer model of the structure using the results of step i),
   iii) collecting data relating to an estimated load on the structure,
   iv) analyzing the structure, using the computer model of the structure and the load data, in order to define high stress areas, in which areas of the structure future problems can be expected,
   v) installing, in the high stress areas, a first set of sensors for measuring the dimensions of the structure in said high stress areas,
   vi) measuring, after a time interval, dimensions of the structure in the high stress areas,
   vii) updating the computer model of the structure, using the results of step vi),
   viii) installing, in the high stress areas, a second set of sensors for measuring the load on the structure in said high stress areas,
   ix) measuring the actual load on the structure,
   x) updating the data relating to the load on the structure, and thereafter,
   xi) re-analyzing the structure, using the updated computer model and the updated load data, in order to calculate a value for the integrity of the structure.

2. Method according to claim 1, further comprising repeating one or more times steps vi), vii), ix), x) and xi).

3. Method according to claim 1, further comprising visualizing the results of step xi).

4. Method according to claim 1, wherein the sensors are connected to a processor, for transmitting data from the sensors to the processing means in real time.

5. Method according to claim 1, further comprising, prior to step iv), collecting data relating to known defects of the structure and thereafter using said defect-data, the computer model of the structure and the load-data for defining areas which are subject to relatively high loads.

6. Method according to claim 1, further comprising, prior to step iv), estimating a minimum size of defects in the structure and thereafter using said estimated defect-data, the computer model of the structure and the load-data for defining areas which are subject to relatively high loads.

7. Method according to claim 6, wherein the minimum size of the defects is estimated to be equal to the precision of measurement equipment used for measuring the dimensions of the structure.

8. Method according to claim 1, further comprising, prior to step iv), collecting data relating to a load-history of the structure and thereafter using said load-history, the computer model of the structure and the load-data for defining areas which are subject to relatively high loads.

9. System for assessing the integrity of a structure, provided with a processor, for containing a computer model of the structure to be analyzed and for using data relating to a load on the structure in the computer model in a calculation of a value representing the integrity of the structure, wherein the system is provided with first sensors to measure data relating to the dimensions of the structure in high stress areas in which areas of the structure future problems can be expected and second sensors to measure the load on the structure in said high stress areas, the sensors being connected to a data logger connected to the processor for transmitting said load and dimension data in real-time to the processor and wherein the processing means are adapted to update the computer model of the structure and to recalculate in the computer model a value representing the integrity of the structure, using said load and dimension data.

10. System according to claim 9, wherein the processor is provided with representation means for visualizing the result of the calculation of the value representing the integrity of the structure.

11. System according to claim 9, wherein the second sensors are adapted to measure pressure exerted on the structure.

12. System according to claim 9, wherein the second sensors are adapted to measure temperature.

13. System according to claim 9, wherein the second sensors are adapted to measure mechanical loading on the structure.

14. System according to claim 9, wherein the second sensors are adapted to measure fluid loading on the structure.

15. System according to claim 9, wherein the second sensors are adapted to measure vibration.

16. System according to claim 9, wherein the second sensors are adapted to measure acceleration experienced by the structure.

17. A computer readable storage medium comprising a computer program comprising data and instructions to carry out the method according to claim 1, when the computer program is executed on a computer system.

18. A computer system comprising a processor and a computer readable storage medium according to claim 17, wherein the computer program, when executed, processes the instructions of said computer program.

* * * * *